APPARATUS FOR SPREADING OR SOWING GRANULAR OR PULVERULENT MATERIAL

This invention relates to an apparatus for spreading or sowing granular or pulverulent material comprising a driven endless member adapted to be bodily moved in transverse direction.

In the known art, such an apparatus consists of a scraper conveyor mounted in transverse direction at the rear of a truck or tractor which carries the material to be spread. The scraper conveyor usually moves in a trough extending along the rear of the truck and there are slits in the bottom of the trough to discharge the material over the ground as the truck advances over the ground. The apparatus may be used for spreading fertilizer or for sowing seeds etc. Other known apparatus comprise a rotary centrifugal spreading disc instead of a driven endless member.

It is an object of the invention to provide another type of a spreading or sowing apparatus comprising a driven endless member bodily movable in transverse direction, which is of simple construction, is reliable in operation and most of all is capable of distributing the material very evenly over the width of the ground which is covered at each pass.

This is obtained according to the invention in that and apparatus for spreading or sowing granular or pulverulent material comprises a driven endless member adapted to be bodily moved in transverse direction, a series of trays mounted on the endless member, means for supplying material into each tray and means for discharging the contents of each tray at a predetermined position.

Preferably, the means for discharging the tray contents are operative at a plurality of different positions longitudinally of the driven endless member. The trays may be pivotally mounted on the endless member, which may be a V-belt, and there may be operating means along the length of the endless member, which keep the trays in horizontal position while passing the outlet opening of a hopper and which pivots each tray to an inclined or vertical position at predetermined points along the lengths of the endless member. In their horizontal positions, the succession of trays may present a continuous surface onto which material may be supplied from the hopper, and the points where the trays are pivoted to inclined positions may be chosen so that a very even distribution of the material is obtained over the width of the strip of ground over which the whole apparatus is bodily moved in transverse direction, e.g., by a tractor which also drives the endless member and, if so desired, an agitator means in the hopper.

Contrary to known apparatus in which the distribution of fertilizer over the width of the ground usually shows bands of higher and lower density, which has the consequence that the growth of the crop is uneven, the distribution of the material obtained by the apparatus of the invention is remarkably even and also well defined at the sides of the covered strip of ground, so that it requires little skill to make the next pass of the apparatus over the ground exactly adjacent to the previous pass without overlap or gaps, contrary to known apparatus in which a certain overlap is necessary because of the decreasing density of the distribution of the material toward the sides of each covered strip.

If desired, additional means for increasing the regularity of the distribution may be mounted under the trays, e.g., a distributing strip extending longitudinally of and under the endless member.

Several embodiments of the apparatus according to the invention will be further described with reference to the accompanying drawings.

FIG. 1 is a rear view of one embodiment;
FIG. 2 is a plan view of the embodiment of FIG. 1;
FIG. 3 is a rear view, partly in section, of a part of the driven endless member of the embodiment of FIGS. 1 and 2;
FIG. 4 is a plan view of FIG. 3;
FIG. 5 is a plan view on a larger scale of part of the driven endless member of FIGS. 1 and 2;
FIG. 6 is a transverse cross section over the left sheave of the driven endless member of FIGS. 1 and 2;
FIG. 7 is a cross section of the hopper and the drive means;
FIG. 8 is a side view of the hopper;
FIG. 9 is a horizontal cross section at the level of the outlet openings of the hopper of FIG. 8;
FIG. 10 is a rear view of another embodiment;
FIG. 11 is a plan view of an embodiment of FIG. 10;
FIG. 12 is a rear view of a third embodiment;
FIG. 13 is a plan view of the embodiment of FIG. 12;
FIG. 14 is a cross section of part of the mounting and driving means of the driven endless member;
FIG. 15 is a partial rear view of an embodiment for sowing in rows;
FIG. 16 is a cross section of the embodiment of FIG. 15;
FIG. 17 is a view corresponding to FIG. 3 of another embodiment of the endless member;
FIG. 18 is a section corresponding to FIG. 7 of another embodiment of the hopper;
FIG. 18A is a plan view of a detail of FIG. 18;
FIG. 19 is a cross section of the mounting means of the endless member of an embodiment with a distributing strip, part of FIG. 19 being a cross section in another plane, namely through the sheave of the endless member;
FIG. 20 is a view from below of the distributing strip of FIG. 19;
FIG. 21 is a partial rear view of an embodiment with another type of distributing strip in a first position;
FIG. 22 is a cross section of FIG. 21;
FIG. 23 is a partial rear view of the embodiment of FIG. 21 with the distributing strip in a second position;
FIG. 24 is a cross section of FIG. 23.

In the embodiment according to FIGS. 1 and 2, the apparatus is mounted on a tubular frame 1, Said frame 1 carries a hopper 2 of an upper rectangular cross section and a circular bottom section, which hopper is supported on the upper ends 59 of vertical parts of the frame 1. The frame 1 moreover supports a driven endless member 3 on sheaves 4 and 5 at the outer ends of oppositely extending arms 9 and 10. The frame 1 also carries connecting points 6 and 7 and 8 for mounting the apparatus on the three-point linkage of a not shown tractor, so that the arms 9 and 10 extend transversely of the tractor behind the rear end thereof and the endless member 3 extends in a substantially horizontal plane. It can be driven from the power takeoff of the tractor via a vertical shaft 13 which is rotatably mounted in the frame 1. The shaft 13 carries a sheave 14 and a V-belt 15 passes around the sheave 14 and around another sheave 16 which is rotatably mounted in the forked outer end of the arm 10. The sheave 5 which carries the endless member 3, is mounted on the same shaft with the sheave 16 so that the endless member 3 is driven when the shaft 13 is rotated. The arms 9 and 10 can pivot in a vertical plane about the pivot pins 11 and 12, see the phantom lines in FIG. 1, so as to decrease the width of the apparatus for road transport. The endless member 3 may be a V-belt which can flex upwardly when the arms 9 and 10 are put in the upward position.

FIGS. 3 and 4 show a part of the endless member 3 which is movable from left to right and carries a series of trays 17 which are pivotally mounted on pins 20 extending transversely through the V-belt 3, see also the schematic view in FIG. 5. The trays 17 are preferably made of a lightweight material such as a synthetic resin which is molded to the desired shape. Each tray 17 comprises a bottom wall 72 an two lateral sidewalls such as 73. The pins 20 extend through a bore 18 in a protrusion 74 under the bottom wall 72 of each tray and are mounted at such a spacing in the V-belt 3 that the right end 25 of the bottom of each tray rests on the left end 76 of the bottom of the next tray when the successive trays are in horizontal position. A pin 19, which extends parallel to the pivot pin 20, is mounted in the thickened left end part 76 of the bottom wall of each tray so as to protrude laterally of the tray in a direction opposite to the side of the tray which is adjacent the V-belt 3. The purpose thereof will be explained later on. The length of the pins 19 is mutually different, see FIGS. 4 and 5, it increases from a minimum (left end of FIG. 4) in regular

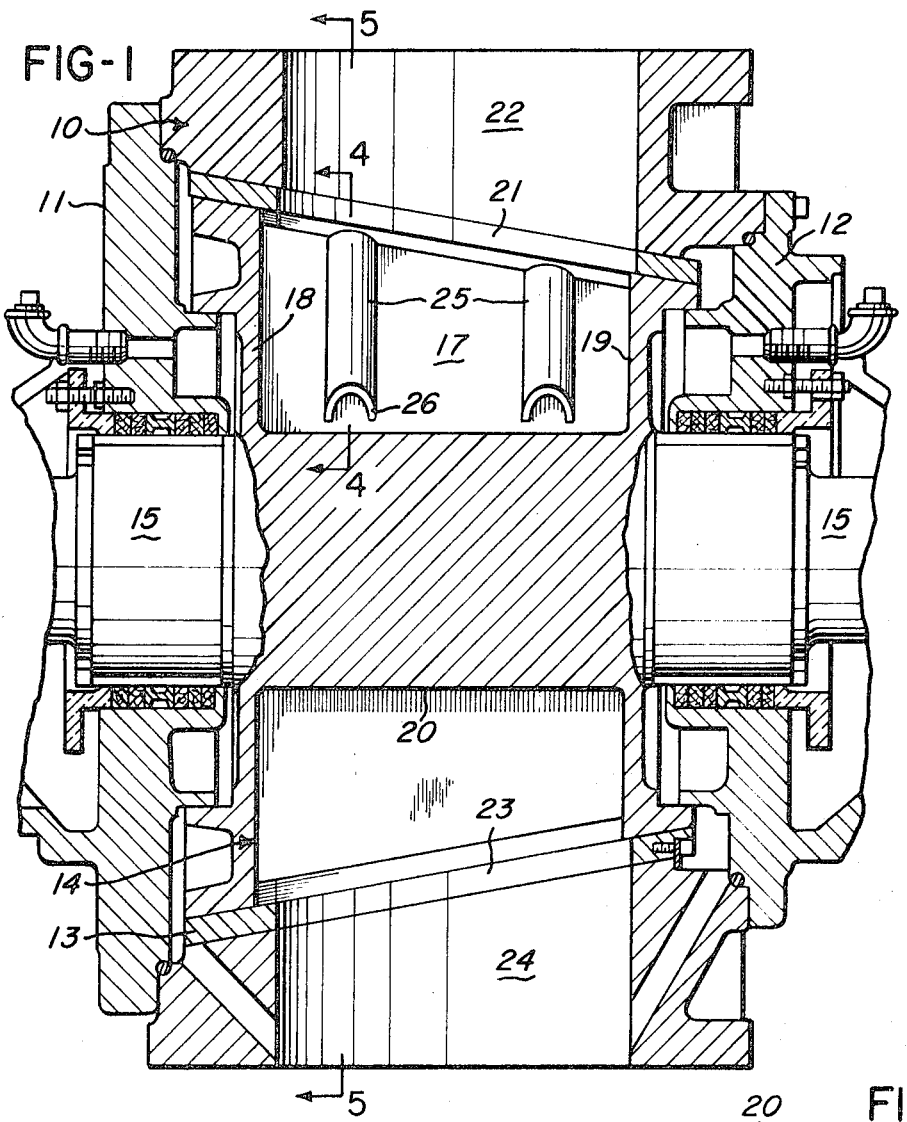
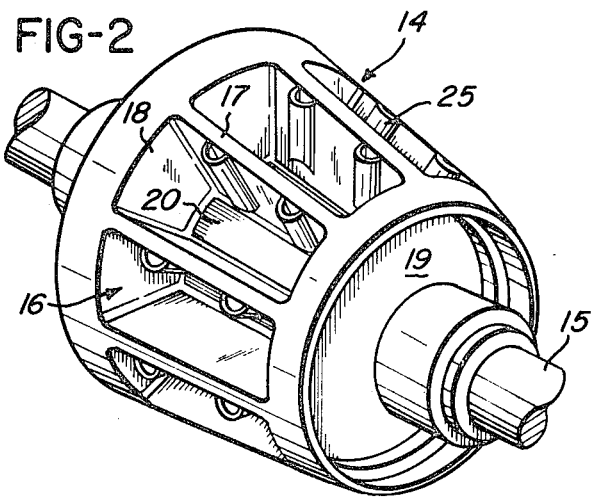
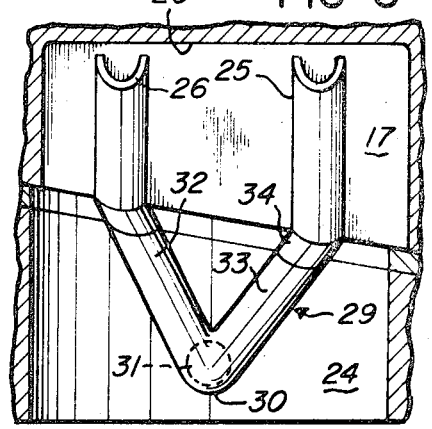
INVENTOR
RUSSELL M. GRAFF
BY Jerome P. Bloom
ATTORNEY

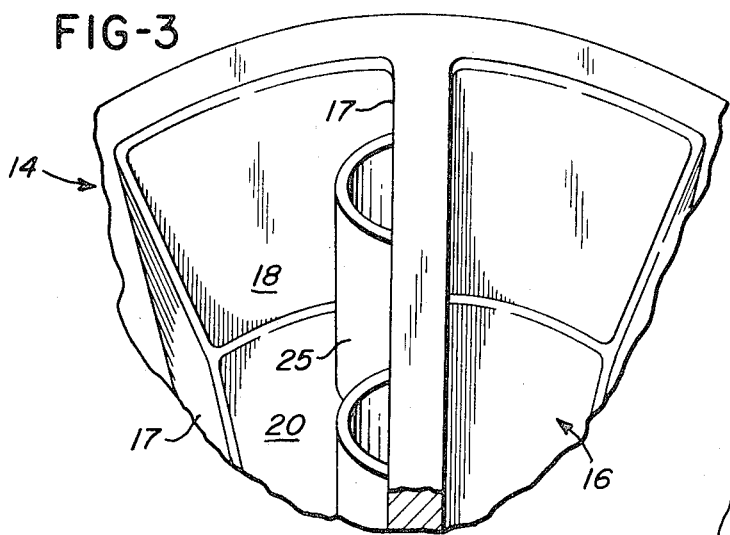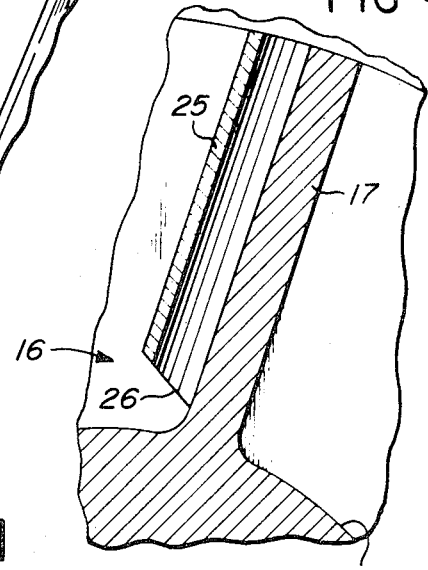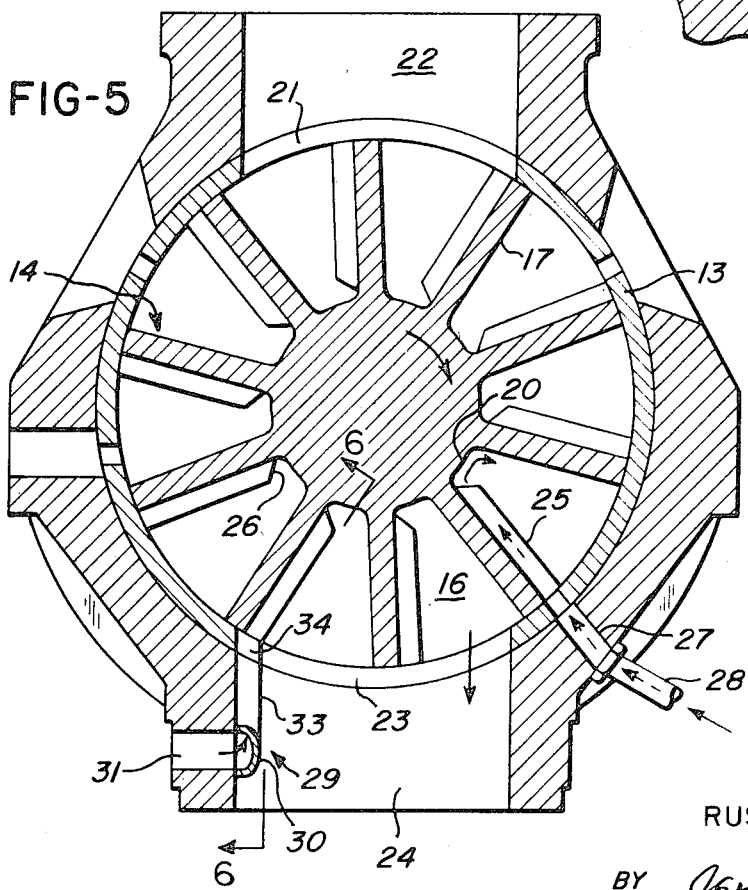

ROTARY VALVES

This is a continuation-in-part of application for U.S. Pat. No. 850,905, filed Aug. 18, 1969, now abandoned, by Russell M. Graff.

BACKGROUND OF THE INVENTION

This invention relates to improvements in rotary valves. It has particular application to those valves used to transfer a wood chip or sawdust based slurry, or for that matter a slurry of any fibrous material, from one environment to another. It will be so described for purposes of illustration. However, it should be noted that embodiments are admirably suited for transfer of any fragmented materials whether in a wet or dry form.

In processing fibrous materials such as wood chips or sawdust from a raw state to an individual fiber form, the materials are subjected to a staged treatment in a variety of conditioning and/or refining units. The equipment and treatment utilized will depend on the ultimate end product desired. Where, for example, the materials must be introduced to a pressurized cooker or digester required to be operated under sealed conditions involving the application of conditioning fluids at a relatively high pressure and a correspondingly elevated temperature, a rotary valve of the type here contemplated is employed for material transfer to and from such units. The rotary valve conventionally used for such purpose incorporates a rotor which is provided with a series of circumferentially spaced pockets in its peripheral surface. The material to be fed to the pressurized unit, from an environment where it has been exposed to atmospheric conditions, for example, is successively introduced at the valve inlet and to each of the rotor pockets as they turn in movement from the valve inlet to the valve outlet. A seal is maintained on each pocket as it moves to the valve outlet. Here the charge of material in the pocket, previously introduced under conditions of lower pressure, must be forcefully ejected. Various means have been contrived to achieve this forceful ejection. It has been suggested to apply steam to pressurize the material in a pocket as it moves between the inlet and outlet, the theory being that as the pocket is exposed to the outlet the higher pressure therein will be sufficient to cause the discharge of the pocket contents. It has been more successfully proposed to apply steam under pressure to enter and scavenge each pocket to discharge its contents as the product registers with the outlet. While this last procedure has proven quite successful in most cases, feeding problems have still remained, particularly in those valves employed for delivering a charge of a wet clinging fibrous material to a pressurized environment from one in which the pressure is at a considerably lower level. The problem is particularly aggravated where the material required to be transferred is essentially a wet wood in the form of sawdust. Where such material is the subject of transfer the rotor pockets have been quite difficult to clear. Remnants of material left in the pockets have not only reduced valve efficiency but propagated leakage of the same to end bells, and attacked the seals and other valve components so as to create and necessitate the requirement for substantial maintenance.

SUMMARY OF THE INVENTION

The present invention is directed to a modification of the rotary valve of the type such as illustrated in the U.S. Pat. to Starrett, No. 3,273,758, issued Sept. 20, 1966. It provides for the application to each of the rotor vanes of means defining passages for direction to the base of each pocket of radially oriented jets of steam or other fluid in a manner to facilitate an application of fluid directly to the base of the pocket. The application of the fluid is first effected immediately preceding a pocket being opened to the valve outlet to apply steam, for example, in jet form to the rear of a charge in the pocket. The structure provided insures the direct impact on the pocket base of the jets of steam or other fluid most effectively, with insignificant energy loss in the process. In such manner one may preload a pocket charge from the rear, in effect inserting a fluid liner for the charge so that on exposure to the valve outlet there will be insured a clean discharge of even wet wood or sawdust from the pocket. Obvious advantages result with or without the benefit of a supplemental scavenging of the pocket as it registers with the valve outlet.

In a preferred embodiment of the invention, a second application of steam or other fluid is effected through the vane mounted passages as the related pocket is discharged and commences to leave the valve outlet. In this second case, there is a dual result. There is not only a scouring of the passages but also a more effective scouring of the pocket walls and insurance of full discharge of material fragments, even where the most difficult materials are being handled. There is produced in any case a forceful and more effective cleansing of the pocket as well as a more effective discharge of its contents by means of the present invention.

The net result is a more complete discharge, dictating increased valve efficiency, and an avoidance of fragments or lumps of wet material adhering to the base surface of the pockets and creating the problems above noted in referring to the prior art.

The invention features have been clearly found to produce an unexpected reduction of load for a given capacity as compared to prior art rotary valves where applied to similar materials, particularly when handling fine, wet clinging fibrous materials.

It is a primary object of the invention to provide an improved rotary valve which is economical to fabricate, more efficient and satisfactory in use, adaptable to a wide variety of applications and unlikely to malfunction.

Another object of the invention is to provide improvements in rotary valves facilitating a more complete and more effective valve discharge, particularly to a pressurized environment.

A further object is to provide means on the vanes of a rotary valve for directing jets of fluid to pass directly to the base of the rotor pockets so as to load their contents from the rear and facilitate thereby the optimal evacuation of the pockets on exposure thereof to the valve outlet.

Another object of the invention is to more effectively cleanse the pockets of a rotary valve as they discharge.

An additional object of the invention is to provide improvements in rotary material transfer valves enabling them to more effectively handle difficult, wet, clinging materials and to do so in a manner to reduce the anticipated load on the valve in the process, thereby reducing the power required for valve operation.

An additional object of the invention is to provide a rotary valve possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

BRIEF DESCRIPTION OF THE DRAWINGS

Referring to the accompanying drawing wherein is shown schematically one but obviously not necessarily the only form of embodiment of the invention, FIG. 1 illustrates a portion of a rotary valve embodying the present invention, shown partly in section for clarity of disclosure;

FIG. 2 is a perspective view of the valve rotor;

FIG. 3 is an enlarged view of a fragment of the valve rotor illustrating the invention improvement as here applied;

FIG. 4 is a further fragmentary sectional view of the valve rotor illustrating the rotor vanes as modified per the present invention;

FIG. 5 is a generally schematic cross-sectional view of the rotary valve illustrating the function of the invention improvements; and FIG. 6 is a sectional view taken on line 6—6 of FIG. 8.

Like parts are indicated by similar characters of reference throughout the several views.

DESCRIPTION OF A PREFERRED EMBODIMENT OF THE INVENTION

Only so much of a conventional rotary valve such as shown in the patent to Starrett, U.S. Pat. No. 3,273,758 is here illustrated as may be necessary to enable one to apply and utilize the structural and functional aspects of the present invention. Other details are neither described nor illustrated since in and of themselves they are available to those versed in the art and form no part of the present invention.

The rotor housing as here illustrated includes a shell 10 forming a chamber of frustoconical configuration oriented on its side and capped to its ends by the respective plate units 11 and 12. The shell 10 has a liner 13 providing a frustoconical bearing surface for the periphery of a complementarily formed valve rotor 14. The plates 11 and 12 are suitably apertured to accommodate bearings and seals through which project the respective ends of the rotor drive shaft 15.

Suitable and conventional rotor drive and rotor-adjusting means, such as shown in Starrett, U.S. Pat. No. 3,273,758, may be connected in an operative relation to the rotor shaft. Also the shaft bearings and seals may be variously contrived to suit the application. The details thereof, however, as previously noted, are not essential to the present disclosure and are therefore not described.

In respect to the valve rotor 14, it may be seen that there is formed in the periphery thereof a series of circumferentially spaced pockets 16. The sides of the pockets are defined by a series of vanes 17 which project radially from and extend in a sense longitudinally of the rotor shaft. At their respective extremities the vanes 17 merge with rotor end walls 18 and 19. Each pocket 16 is thus defined at its sides by a pair of vanes 17 and at its ends by the rotor end walls 18 and 19. The form of the pocket is such that it assumes a wedge shape, the apex of the wedge being rounded to create an arcuate base 20.

Noting the drawings a valve inlet opening 21 is defined in the top of the shell 10 and the liner 13, centered intermediate its ends, by an inlet chute 22. A diametrically opposite opening 23 in the shell 10 and liner 13 is defined by a valve outlet chute 24.

As indicated in the drawings, in the function thereof to deliver material entering the inlet to a pressurized environment, the rotor 14 will turn clockwise. Accordingly, having this direction of movement in mind, on the trailing or back surface of each rotor vane 17 are two ducts 25. These ducts are so positioned to be radially oriented and parallel, spaced in a sense longitudinally of the valve rotor and substantially equidistant from the adjacent pocket end walls 18 and 19. The ducts as illustrated are defined by half sections of longitudinally split pipes. The outer end of each pipe opens at the periphery of the rotor, at the outer edge of the vane to which it is welded. Its inner end terminates immediately of the pocket base 20, a bevel 26 being cut on the innermost edge, preferably at an angle of approximately 60°. This is to facilitate the smooth exit of a jet of steam, for example, or conditioning fluid, from each duct to sweep the base 20 and load the pocket contents from the rear with a pressured layer of fluid.

Referring to FIG. 5 of the drawings, immediately preceding and adjacent the valve outlet the valve housing has engaged therein through aligned openings in the shell 10 and liner 13 a pair of fittings 27. Openings from the latter are arranged to mate with the entrance openings to the respective ducts 25 on the rotor vanes as they move thereby in the advancement of the rotor pockets to the valve outlet. Applied to the fittings 27 are the discharge ends of conduits 28 which are connected to a suitable source of live steam. It may thus be readily observed that as a pair of ducts 25 momentarily register, in passing, with fittings 27, there is simultaneously delivered to the base 20 of a rotor pocket, two jets of steam. These jets move across the base from the leading edge thereof and spread laterally to cause a lifting of the charge of material which seats thereto, through the medium of a pressured layer of fluid, to load it from the back and discourage any tendency of the contents, even where wet and clinging, to adhere to the pocket base. This pressure is applied to the bottom of the pocket immediately prior to exposure thereof to the valve outlet. There is a continuing flow of the steam to the pockets as the ducts 25 at the leading surface thereof pass the fittings 27, the result of which is to supplementally condition the charge in the pocket and assist in the discharge of the contents when the pocket moves to expose its contents to the valve outlet. As the pocket is exposed, the pressure of the layer of fluid to the rear of the charge will be at a level sufficient to produce a forceful ejection of the charge, the energy stored therein having been released by the exposure. The continuing flow of steam to the pocket as long as any portion thereof remains exposed to fittings 27 produces a supplemental discharge effect which is a followup to the initial forceful ejection. In this manner there is insured a significant increase in the direction of a complete discharge of the pocket contents, independently of the subsequent application of a direct scavenging flow of fluid as employed in the discharge outlets of the prior art rotary valves.

In addition to the foregoing, in the case of the present invention, it has been further found that the ducts 25 can be used in a most effective manner for insuring a most complete scouring of a pocket surface on discharge of its contents. In the process of this additional use of the ducts 25, there is also produced a most effective scouring of the walls of the ducts themselves.

In this last respect, referring to FIGS. 5 and 6 of the drawings, it is there seen that a V-shaped conduit 29 is integrated with a portion of the inner wall surface of the chute 24 most remote from the fittings 27. In this instance, the conduit 29 is shown as comprised of longitudinally split sections of pipe corresponding in character to the elements forming the ducts 25. In this manner it is insured that the cross section of the passage defined by the respective portions of the conduit 29 is essentially the same as that of the ducts 25. The apex 30 of the V which depends in the outlet chute 24 in the direction of material discharge is sealed at its bottom.

Formed in the wall of the outlet chute 24 is an aperture 31 opening to the interior of conduit 29 at its apex 30. Further, from the apex 30 the branch portions 32 and 33 of the V-shaped conduit extend upwardly in divergent relation to have their extremities continued from the wall of chute 24 by terminal segments 34 welded thereto and in connection with the liner 13 in the opening 23. The terminal segments 34 are so positioned and formed to have the openings therefrom precisely register with the outer ends of ducts 25 on the rotor vanes as the pertaining rotor pocket bridges the outlet chute 24.

As illustrated in FIG. 5, the aperture 31 provides a passage for injection of steam to the base or apex of the V-shaped conduit 29. This steam is directed through the divergent branches 32 and 33 and the extensions 34 on the liner 13. As will be obvious, therefore, as each rotor pocket fully aligns with aperture 23 in discharge of its contents, at that point of travel extensions 34 and its ducts 25 will have their adjacent ends mate. As this occurs, the steam will move through the mated ducts 25 in a scouring relation thereto and issue as concentrated jets impacting at the very base of the pocket. The total energy produced is utilized as the jets move across the base from the leading edge thereof and spread laterally and downwardly of the pocket walls to cause a most effective displacing force to be exerted on any particle of material which might tend to adhere to the walls, even after the application of similar jets immediately preceding the valve outlet in a manner as previously described.

It has been unexpectedly found that where particularly difficult materials are handled, such as a wet clinging sawdust, that not only does this second use of the conduits 25 for scouring and scavenging purposes insure that at their next presentation to the fittings 27 there will be a continued effective use of jet flow therethrough but there has also proven to result a more positive scavenging of a pocket being discharged. Multiple advantages result, including power savings per unit material handled, a minimizing of maintenance requirements and a reduction of wear of the valve components during use thereof.

There is yet another unexpected and attendant benefit in use of the inventive concepts here described. There is created for a rotary valve of a given size a capacity of material handling to a degree not previously contemplated.

Of course other openings may be provided following the valve inlet and the valve outlet for introduction of steam to the valve pockets or scavenging of a steam therefrom such as contemplated in the prior art. Irrespective of the employment of such other openings, which are not detailed since in and of themselves not essential to the understanding or practice of the present invention, the application of the present invention affords significant benefits as above noted and lends an advance in a particular segment of the art, here described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A rotary valve comprising a rotor the periphery of which includes at least one pocket, a housing for said rotor including means defining an inlet thereto for introducing a charge of material to said pocket on alignment therewith and an outlet therefrom for discharge of the charge on exposure of said one pocket to said outlet and means including at least one passage for introducing fluid directly to the base of said pocket, to the rear of the charge therein, to preload the charge from its rear prior to the exposure thereof to said outlet whereby to produce a forceful ejection of said charge in an automatic response to its exposure to said outlet.

2. A rotary valve as set forth in claim 1 characterized by said means for preloading the charge including a plurality of passages arranged to provide for direct radial impact of jets of fluid on the base of said one pocket to encounter said charge in an area to the rear thereof whereby to lift the charge from said base and store energy to its rear to provide said forceful ejection of the charge on exposure to said outlet.

3. A rotary valve as set forth in claim 1 characterized by said rotor incorporating, in the walls defining each said pocket, radial passages which open at their inner ends immediately adjacent the base of said pocket for radial jets of fluid to impact thereon to provide thereby said means for preloading the charge in said one pocket.

4. A rotary valve as in claim 3 characterized by means in connection with said rotor housing at said outlet adapted to align with said passages and direct therethrough fluid jets to scour said passages and the walls of the associated pocket.

5. A rotary valve as in claim 1 characterized by duct means associated with the leading surface of each said pocket and opening to the base of said pocket, said duct means providing a flow path for directing fluid to spread over the base of said pocket to produce a pressure load on the charge therein from its rear.

6. A rotary valve as in claim 5 characterized by means in said outlet in the form of jet-defining passages adapted to align with said duct means, as the related pocket registers with said outlet, for directing scouring jets of fluid through said duct means and from said duct means to produce a scouring of the pocket base and the walls to clear the same in the event any difficult clinging materials should remain on discharge of the pocket contents.

7. A rotary valve as in claim 1 characterized by said means for preloading including duct means located in connection with one surface of said pocket and there being means in connection with said housing for delivery of fluid to said duct means under pressure as said pocket approaches said outlet to provide the preloading of the charge to its rear and to continue the delivery of said fluid to said pocket as it is initially exposed to said outlet.

8. A rotary valve as in claim 7 characterized by said duct means having a radial orientation and extending from the outer periphery of said rotor to a point adjacent the base of said pocket.

9. A rotary valve as in claim 8 characterized by means in said outlet for directing through said duct means fluid under pressure to scour said duct means on registration therewith and simultaneously produce a scouring of the pocket walls on registration of the pocket with said outlet.

10. A rotary valve as in claim 8 characterized by said duct means including a plurality thereof having a parallel relation and being spaced intermediate the ends of said pocket.

11. A rotary valve as in claim 7 characterized by said duct means having a radial orientation and being centered intermediate the ends of said pockets.

12. A rotary valve unit as in claim 1 characterized by said rotor having a plurality of circumferentially spaced pockets defined at its periphery by radially projected vanes, each said vane having on the trailing surface thereof means defining conduits leading from the periphery of said vane to the base of the related pocket, said conduits serving for directing fluid to the base of said pockets immediately preceding the valve outlet so as to condition the contained charge for forceful ejection through said outlet by storing energy to its rear.

13. A rotary valve as in claim 12 characterized by said conduit means being formed by pipelike sections connected integral with the trailing surface of each vane, said conduit means having an inlet opening at the periphery of said rotor and a discharge opening immediately adjacent a pocket base.

14. A rotary valve as in claim 13 characterized by the discharge end of said conduit means having a bevel to open the discharge end to define a discharge opening which is greater than the inlet opening to said conduit means.

15. A rotary valve as in claim 1 characterized by further means including a portion of said first-mentioned preloading means operative on registration of said one pocket with said outlet to produce a cleansing flow of fluid immediately at the base of said pocket whereby to forcefully scour said pocket in the course of its discharge.

* * * * *